(12) United States Patent
Langoulant et al.

(10) Patent No.: US 9,239,606 B2
(45) Date of Patent: Jan. 19, 2016

(54) POWER MANAGEMENT ENHANCEMENT

(71) Applicant: Apple Inc., Cupertino, CA (US)

(72) Inventors: Brendan J. Langoulant, San Francisco, CA (US); Justin Titi, Morgan Hill, CA (US); Eric J. Albert, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 507 days.

(21) Appl. No.: 13/659,792

(22) Filed: Oct. 24, 2012

(65) Prior Publication Data

US 2013/0332755 A1    Dec. 12, 2013

Related U.S. Application Data (60) Provisional application No. 61/657,479, filed on Jun. 8, 2012.

(51) Int. Cl.
  *G06F 1/00* (2006.01)
  *G06F 1/32* (2006.01)
  *H04W 52/02* (2009.01)

(52) U.S. Cl.
  CPC ......... *G06F 1/3206* (2013.01); *H04W 52/0261* (2013.01); *G06F 1/3212* (2013.01); *Y02B 60/1292* (2013.01); *Y02B 60/50* (2013.01)

(58) Field of Classification Search
  CPC ....... G06F 1/32; G06F 1/3206; G06F 1/3212; H04W 52/0261
  See application file for complete search history.

(56) References Cited

U.S. PATENT DOCUMENTS

| | | | |
|---|---|---|---|
| 7,506,144 B2 * | 3/2009 | Zhao et al. | 713/1 |
| 8,135,392 B2 | 3/2012 | Marcellino et al. | |
| 8,484,335 B2 * | 7/2013 | Whitfield et al. | 709/224 |
| 2003/0069008 A1 | 4/2003 | Nakazawa et al. | |
| 2005/0166077 A1 | 7/2005 | Reisacher | |
| 2006/0173704 A1 | 8/2006 | Hair et al. | |
| 2007/0162582 A1 | 7/2007 | Belali et al. | |
| 2010/0069127 A1 | 3/2010 | Fiennes | |
| 2010/0216436 A1 | 8/2010 | Wijayanathan et al. | |
| 2011/0231517 A1 | 9/2011 | Srinivasan et al. | |
| 2012/0233031 A1 * | 9/2012 | Chang et al. | 705/27.1 |

FOREIGN PATENT DOCUMENTS

EP    1 978 720 A1    10/2008

OTHER PUBLICATIONS

PCT International Preliminary Report on Patentability for PCT/US2013/042297, mailed Dec. 18, 2014.
PCT International Search Report for PCT/US2013/042297, mailed Sep. 5, 2013.

\* cited by examiner

*Primary Examiner* — Jaweed A Abbaszadeh
*Assistant Examiner* — Austin Hicks
(74) *Attorney, Agent, or Firm* — Blakely, Sokoloff, Taylor & Zafman LLP (57) ABSTRACT

In one embodiment described herein, a device having an account permitting access to network-based storage, receives a push notification indicating that one or more assets has been shared by another person. In response to the push notification, the device begins downloading the new asset to the device, while starting two timers. When the first timer finishes, the user is notified about the new asset that is available. When the second timer finishes, the download, if still in progress, is interrupted to save power.

27 Claims, 9 Drawing Sheets

*PHOTO STREAM WITH "LAST UPDATED" FOOTER*

POWER MANAGEMENT ENHANCEMENT

CROSS-REFERENCE TO RELATED APPLICATIONS

This application claims benefit of U.S. Provisional Application No. 61/657,479 filed Jun. 8, 2012, and hereby incorporates herein by reference this provisional application.

TECHNICAL FIELD

The technical field relates generally to mobile device network power management, and in particular, to manage power of a device, such as mobile devices that can exchange data with other devices through a network.

BACKGROUND OF THE DISCLOSURE

As mobile electronic devices have matured, a multitude of wireless radio technologies have been developed to enable network connectivity. Voice network enabled mobile devices use various radio technologies to access a mobile voice network. Additionally, many devices support data technologies such as Bluetooth, Wi-Fi, and Near Field Communication (NFC), as well as various mobile data network connections all compete for power resources. In some instances, aspects of the technologies that have enabled the increase in the throughput of wireless data networks devices has also increased the power consumption of those devices as a result. For example, in mobile devices equipped with Long Term Evolution (LTE) radios, multiple antennas are used for the LTE connection. Additionally, some voice enabled mobile devices equipped with LTE require a companion voice network connection in parallel to the LTE data connection, further increasing power consumption. In general, the multitude of radio technologies available on modern mobile devices can result in a significant impact on a device's power budget.

Network device power consumption can be especially noticeable when background data transfers are in use. In such instances, a mobile device in an otherwise idle state can maintain a network connection to push or pull data to maintain a sync relationship with an e-mail or calendar server, or to receive push messages from an application, such as, for example, a social networking application, a distributed storage network service, or some other application or service that conducts data transactions in the background while a device is otherwise idle. If a mobile device's network is continually active, even while the device is seemingly idle and not being actively used, the device can experience rapid power drain and harm user experience.

SUMMARY OF THE DESCRIPTION

Methods, machine-readable tangible storage media, and data processing systems that enable mobile devices to reduce power consumption without detracting from the user experience are described. In the description that follows, a data processing system or mobile computing device are collectively referred to as a device, and content for the device, which can be a digital photograph, video or other type of media file, data file, or other type of electronic content, is referred to as an asset. Additionally, backup data from a cloud data backup service may also be delivered as an asset.

In one embodiment, a device having an account permitting access to network-based storage, receives a push notification indicating that one or more assets has been shared by another person. In response to the push notification, the device begins downloading the new asset to the device, while starting two timers. When the first timer finishes, the user is notified about the new asset that is available. When the second timer finishes, the download, if still in progress, is interrupted to save power.

In one embodiment, in response to a push notification indicating access to a network-based storage, the device begins uploading a new asset to the network-based storage device, while starting two timers. When the first timer finishes, the user may optionally be notified of the asset transfer progress, and when the second timer finishes, the upload, if still in progress, is interrupted to save power.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Methods and apparatuses for enabling network device power management for mobile devices while reducing the negative impact of such power management to user experience. In the following description, numerous specific details are set forth to provide thorough explanation of embodiments of the present invention. It will be apparent, however, to one skilled in the art, that embodiments of the present invention can be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

The processes depicted in the figures that follow are performed by processing logic that comprises hardware (e.g. circuitry, dedicated logic, etc.), software (non-transitory machine-readable medium for execution by a data-processing system), or a combination of both hardware and software components. Although some processes are described below in terms of sequential operations, it should be appreciated that some of the operations described may be performed in different order. Moreover, some operations may be performed in parallel rather than sequentially.

The present description includes material protected by copyrights, such as illustrations of graphical user interface images. The owners of the copyrights, including the assignee of the present invention, hereby reserve their rights, including copyright, in these materials. The copyright owner has no objection to the facsimile reproduction by anyone of the patent document or the patent disclosure, as it appears in the Patent and Trademark Office file or records, but otherwise reserves all copyrights whatsoever. Copyright Apple Computer, Inc. 2012.

In one embodiment, devices can generate assets that can be transmitted to other devices. These assets can include photos or videos that were captured with image capturing features on a mobile communications device, such as a cell phone, or other type of computing device, including an iOS device, such as an iPhone or iPad device from Apple Inc. of Cupertino, Calif. Network-based storage may be available for transmitting these assets to and from a device. For example, network-based storage may be offered in the cloud (or cloud storages, cloud services) via third party vendors such as Amazon S3, Microsoft, etc., to user devices such as an iOS device, an iPhone or iPad device from Apple Inc.

Figure 1:
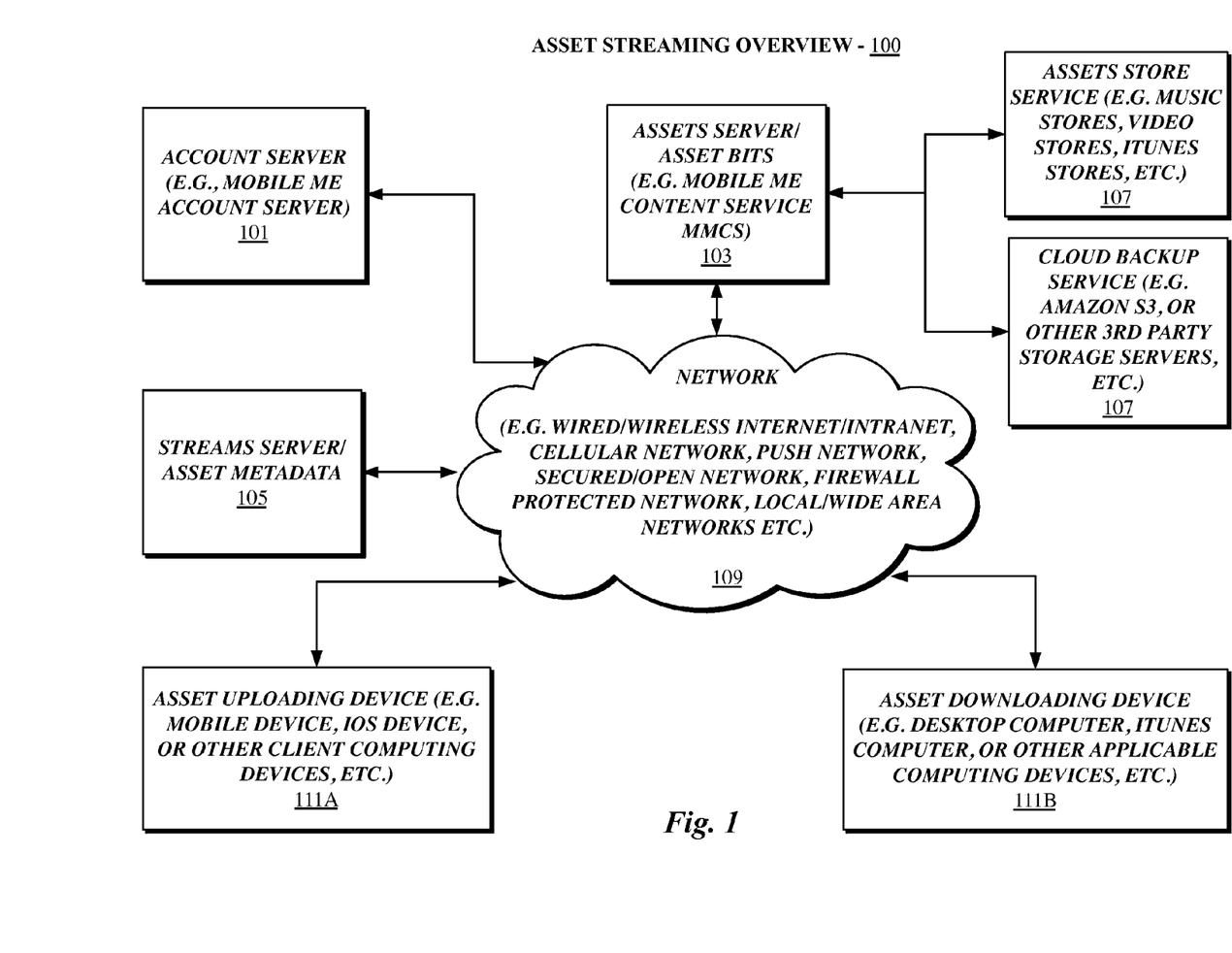
FIG. 1 is a block diagram overview illustrating one embodiment of network systems for asset streaming.
Figure 2:
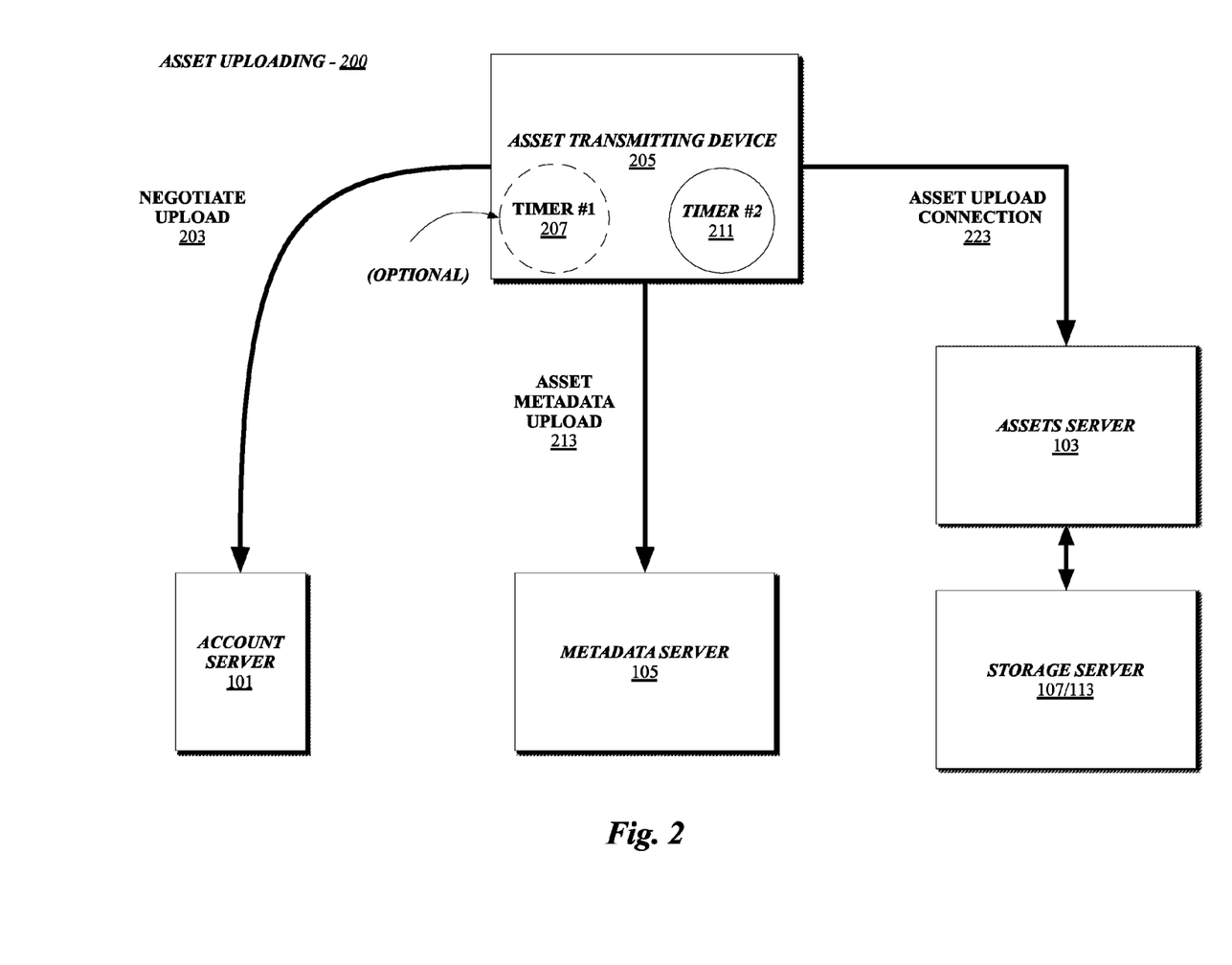
FIG. 2 is a block diagram overview illustrating one embodiment of a network system for asset uploading.
Figure 3:
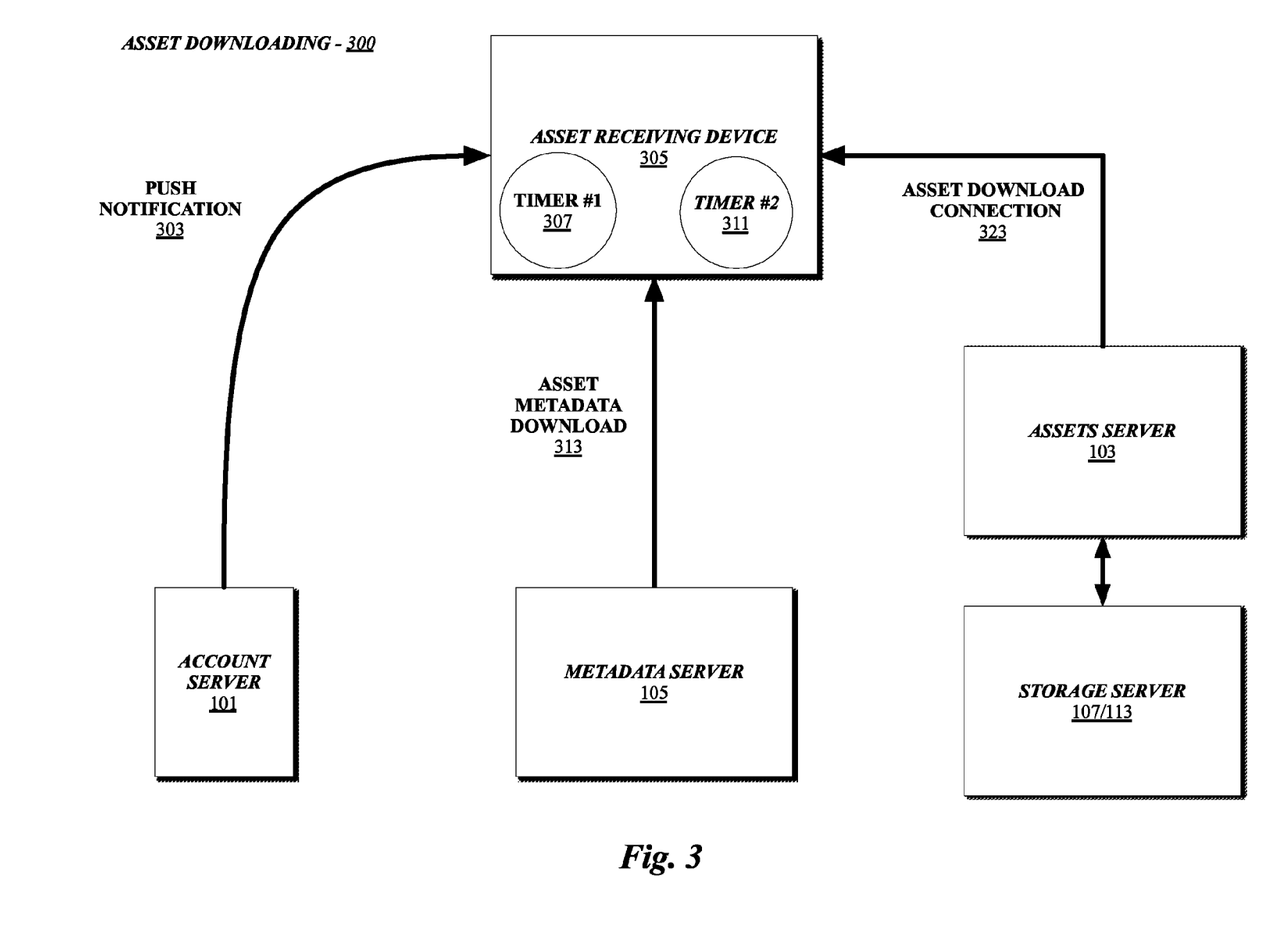
FIG. 3 is a block diagram overview illustrating one embodiment of a network system for asset downloading.

Prior to describing specific embodiments of the invention, examples will be provided in conjunction with FIGS. 1-3 of the environments in which these embodiments can operate. It will also be understood that the terms "stream" and "streaming" are meant to refer to acts in the transmission or receipt of data and are not intended to be limited to streaming video, or other streaming content, in which a video file is received in part and played back, in part, before the video file is completely received by the device receiving the "streaming video."

FIG. 1 is a block diagram overview illustrating one embodiment of network systems for asset streaming or distribution according to one embodiment described herein. Networked systems for asset distribution 100 may include dynamically configured networks 109 connecting servers 101, 103, 105, 107 and 113 and streaming-enabled devices 111A and 111B. For example, an asset uploading device 111A, such as a phone device, may be sporadically connected with an assets server, such as the MobileMe Content Service (MMCS) provided by Apple Inc., depending on where device 111A is located. Device 111A may intermittently be locally coupled or directly connected (e.g. via a wire) to another device 111B, or an asset downloading device, which, for example, can be another mobile computing device or, more typically, a stationary device, such as a desktop computer capable of accessing mass storage devices, such as hard disks, solid state devices, flash memories or other storage services.

In one embodiment, device 111A captures or otherwise generates assets that may be distributed via network 109 to multiple recipients (e.g. servers, asset stores, storage services) 101, 103, 105, 107, 113 generally referred to as cloud storage, and subsequently to other recipient devices, such as device 111B. The recipients may be identified on the fly, and in some cases the recipients that are identified vary depending on the current location of the device 111A from which the assets originated.

In one embodiment, an account server 101, such as the account server of the iCloud service offered by Apple Inc., maintains an account for the device 111A that identifies, among other information, whether the device 111A and other devices 111B associated with the account are eligible to participate in asset streaming or asset sharing, including identifying whether other devices 111B not normally associated with the account are currently following assets distributed by the device 111A.

In one embodiment, a metadata server 105 operates in conjunction with the account server 101 to filter those assets that are eligible for distribution based on the asset metadata, account and other information associated with the devices, such as device 111A and device 111B, to and from which assets are distributed. The metadata may include information about assets for filtering which assets can be streamed or downloaded from the network-based storage service to other devices associated with the device, including a size of the asset, an image resolution of the asset when the asset is an image, a date of the acquired asset, and security information restricting access to the acquired asset, such as restricting access to certain other accounts or devices.

FIG. 2 is a block diagram overview illustrating an exemplary system for asset uploading 200 in accordance with one embodiment of network systems for asset distribution 100. In one embodiment, the asset-transmitting device 205 negotiates with an account server 101 for account authorization to upload or stream assets. If access is appropriate, the account server 101 authorizes the asset-transmitting device 205 to transmit assets to the account server. In one embodiment, the device 205 then uploads the asset to an assets server 103 over asset upload connection 223. Once uploaded, assets server 103 may store, in one embodiment, the prepared chunks of data that make up the asset on a storage server 107/113 or the like, in accordance with an asset data bits storage algorithm. In one embodiment, the asset-streaming device may additionally upload metadata information to a metadata server 105 to provide asset metadata for the asset.

In one embodiment, when the asset-transmitting device 205 begins to upload an asset, an optional first timer 207 and a second timer 211 are started. In one embodiment, if the first timer 207 expires before the asset upload completes, the device can indicate, in one manner or another, that an asset is being uploaded to an asset service. In one embodiment, the device can notify the user via a user interface notification, while other embodiments can use an icon badge, a sound alert, or some other manner of notification. In one embodiment the device does not give any specific notification that an asset is being uploaded to an asset service. In one embodiment, if the second timer 211 were to expire before the completion of an upload the device can interrupt the upload and allow the device to enter a low power state. Subsequently, at the occurrence of some network event or user directed event, the device can wake and allow the upload to resume.

FIG. 3 is a block diagram overview illustrating an exemplary system for asset downloading in accordance with one embodiment of network systems for asset streaming 100. In one embodiment, if an asset is available for download from an asset service, the account server 101 can generate a push notification that is received by an asset-receiving device 305. In response to the push notification, the asset-receiving device 305 may begin to download the asset from an assets server 103 over asset download connection 323. In one embodiment the asset can be downloaded from a network based cloud backup service, 113 or from an asset store service 107.

According to one embodiment, when the asset-receiving device 305 begins to download an asset, a first timer 307 and a second timer 311 are started. In one embodiment, if the download completes before the expiration of both the first timer and the second timer, the asset-receiving device 307 can notify the user of the availability of the asset. If the first timer 307 expires before the asset download completes, the asset-receiving device 305 can indicate, in one manner or another, that an asset is being downloaded from an asset service. In one embodiment, in the event the second timer expires before the download of the asset is complete, the asset-receiving device 305 may interrupt the download and allow the network elements, and optionally other elements of the device to enter a low power state. Subsequently, at the occurrence of some network event or user directed event, elements of the device in a low power state can wake and the download can resume.

In one embodiment, the duration of the first timer 207, 307 can be suggested or adjusted by parameters remotely provided by the account server 101, metadata server 105 or assets server 103. Alternatively the first timer can have a heuristically determined duration set by the asset transmitting device 205, or asset receiving device 305, or can be of static duration. In one embodiment, the duration of the first timer is tunable by data gathered by, for example, but not limited to the account server 101, metadata server 105, assets server 103, or some other server that is aware of statistical data regarding the amount of time it takes to fully download all assets or for a user to respond to a notification of assert availability.

In one embodiment, if the data indicates that users generally take at least 10 seconds before responding to such a notification, then the first timer can be set to equal or greater than 10 seconds; the response time can be measured by the user's device and can be the time between the presentation of such notification (which can be both a sound and a displayed alert on a display of the user's device) and the user's selection of such notification (which can be when the user presses or touches the notification, or other types of selections known in the art). This time can be reported, by a group of devices, over time to a server, which can then statistically process this collection of time data and then derive a suggested time for the first timer. In one embodiment, the time duration of the first timer can be proportional to the time it takes for users to respond to such notification.

Figure 4:
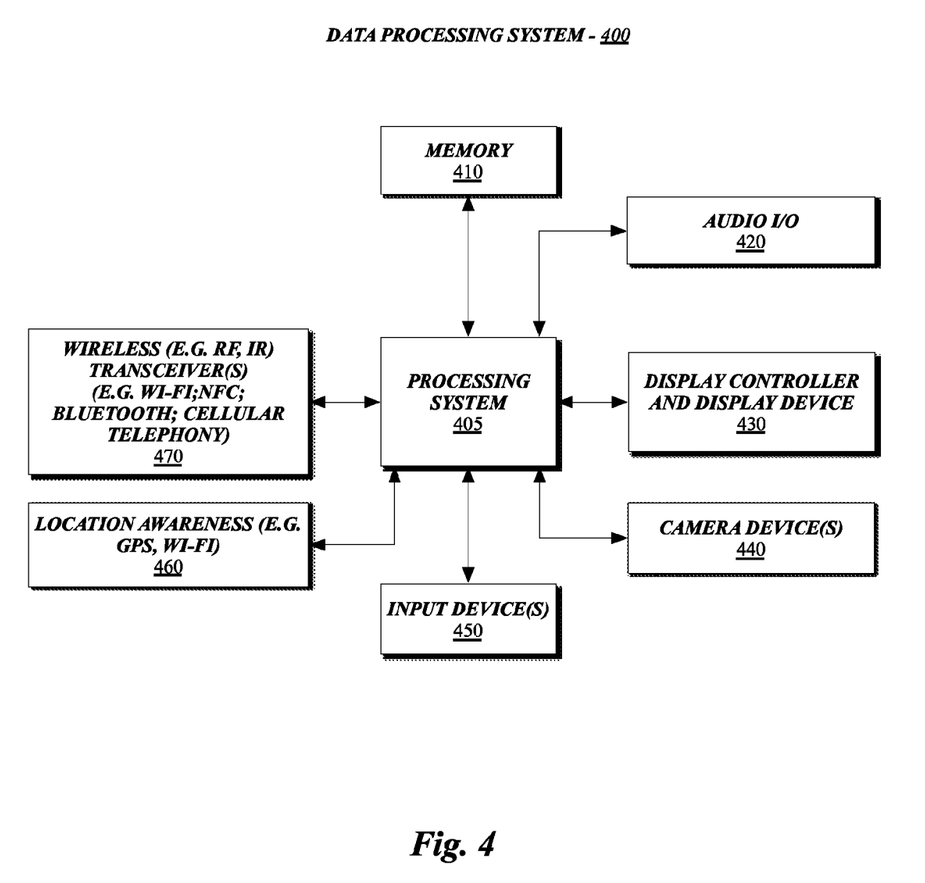
FIG. 4 is a block diagram overview illustrating some of the components of a mobile device according to embodiments of the invention.

An asset-streaming device that can implement embodiments of the invention can be represented as a data processing system with components similar to those illustrated in FIG. 4. The data processing system 400 includes a processing system 405 which can contain one or more microprocessors. The system 400 also includes memory 410 for storing data and programs for execution by the processing system. The system 400 additionally includes an audio input/output subsystem 420 which may include a microphone and a speaker for playing back music or providing telephone functionality through the speaker and microphone.

A display controller and display device 430 can be used to provide a graphical user interface for the user. The wireless transceiver 470 can transmit and receive data via one or more wireless technologies such as Wi-Fi, infrared, Bluetooth, or one or more variants of wireless cellular technology. Embodiments of system 400 can also contain one or more camera devices 440 configured in both a front and rear facing configuration, though similarly configured systems each with a front facing camera can be one of many optimal configurations. The data processing system 400 can also include one or more input devices 450 that allow a user to provide input to the system. Input devices can include a keypad or keyboard, alone or in conjunction with a touch or multi touch panel that is overlaid on the display device 430. Additionally, embodiments of the data processing system 400 can also include a device for providing location awareness, such as a Global Positioning System (GPS) device 460 or its equivalent. Embodiments could use that information about location to manage the power profile of a device to allow more or less power to be used based on geographic location.

It is to be noted that the data processing system 400 as represented in FIG. 4 is by way of example. One or more buses or interfaces, which are not shown, can be used to interconnect the various components, as is well known in the art. As well, additional components, not shown, may also be part of the system 400 in certain embodiments, and in certain embodiments fewer components than shown in FIG. 4 may also be used.

Figure 5:
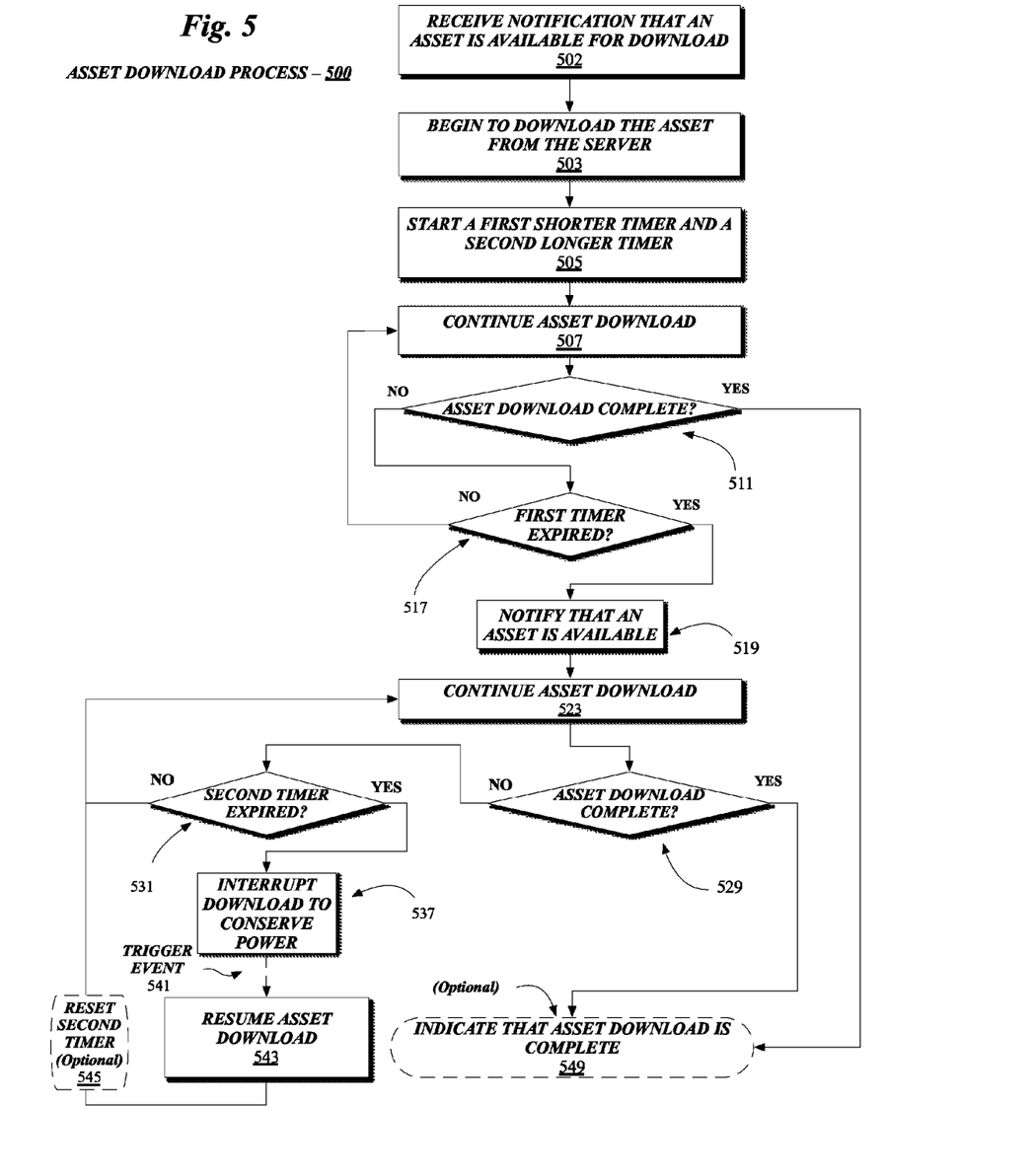
FIG. 5 is a flow chart illustrating one embodiment of a method for enhancing power management when streaming assets from a network system.

FIG. 5 illustrates an embodiment of a method of power management enhancement during an asset download by, in one embodiment, asset downloading device 111B of FIG. 1. Asset download is used as an example, but an embodiment of a method of power management enhancement during an asset upload by, in one embodiment, asset uploading device 111A of FIG. 1, would be substantially similar excepting the device would be uploading instead of downloading. In one embodiment, an asset-streaming device can conduct an operation 502 that is trigged by receiving a push notification that an asset is available for download. The push notification can trigger an operation 503 where the asset downloading device 111B can begin to download the asset from the asset server. In one embodiment, at substantially the same time as operation 503, operation 505 can occur where a first timer and a second timer are started on the device. In one embodiment, the first timer can be of a shorter duration in comparison with the second timer. The device can delay notification to the user that an asset has been shared, or is otherwise available for download until the expiration of the first timer. Hence, the first timer acts to create such a delay; in other words, rather than providing such notification (that an asset has been shared or is otherwise available for download) immediately after receiving the push notification, the first timer delays the notification to the user. During the delay period, the device can, along with other device operations, perform operation 507, which continues the asset download until the device determines the download is complete 511 or determines that the first timer has expired 517.

In one embodiment, the device can perform operation 511, which determines whether the asset download is complete. In the event the asset download is not complete, the device can perform operation 517 to determine whether the first timer has expired. In the event that the first timer expires before the asset download is complete, a notify operation 519 can occur that notifies a user of the device of the availability of new assets. In one embodiment, the user can respond to the notification in operation 519; this response can include a selection by the user of a visual presentation (e.g., in an alert presented as a timed window or view). The selection can be the user touching the visual presentation or other selections known in the art. In one embodiment, the user's device can respond to the user's selection by presenting one or both of a thumbnail (e.g., a reduced resolution image of a photo if the shared asset is a photo) and a download progress indicator, such as a moving progress bar, which shows the status of the download. In the event the asset download completes before the expiration of any timer, operation 549 may optionally occur indicating that an asset has been downloaded, or is otherwise available to the user. Such indication may come in the form of an express user notification such as the notification which can occur on the expiration of the first timer, or can occur as a change in an icon or an icon badge that a user can take notice of when next accessing the device.

In one embodiment, if the asset download does not complete before the first timer has expired, after the device performs operation 519 to notify the user of the availability of an asset, the device can perform operation 523 where the device can continue the asset download while operation 529 determines whether the asset download is complete. In one embodiment, the device can perform operation 531 to determine if the second timer has expired. If the second timer has expired before the asset download is complete, the device can perform operation 537 to interrupt the asset download. In one embodiment, after the asset download is interrupted, some later event 541 can occur that can trigger an operation 543 that resumes the asset download. The resume event can be a network event such as an incoming push notification or incoming network traffic or change in network conditions, or can be a user directed event that requires the use of the network device (e.g. launching an application that would contain the assets). In one embodiment, an operation 545 can reset the second timer after the trigger event 541 causes the asset download operation 543 to resume, and the device can return to operation 523, which continues the asset download while performing operation 529 that further determines if the asset download is complete.

Figure 6:
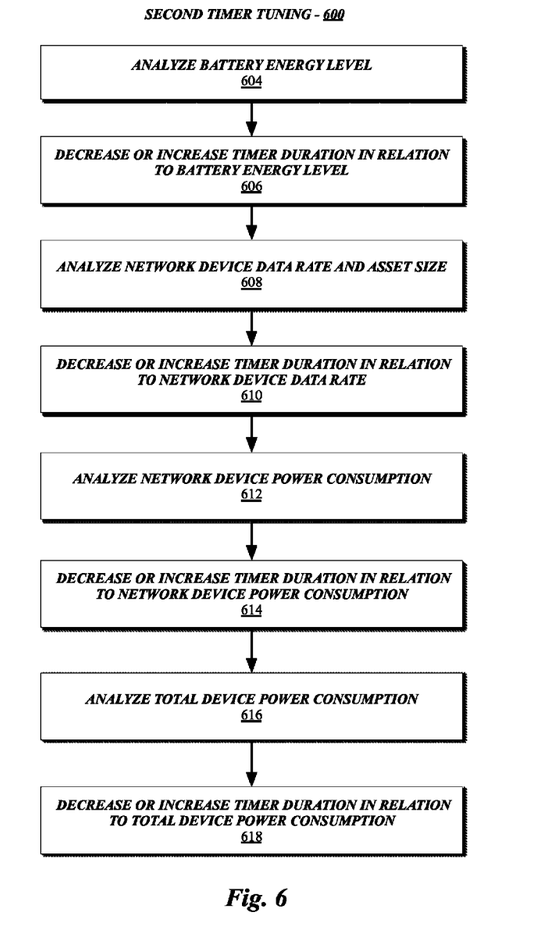
FIG. 6 is a flow chart illustrating one embodiment of a method for adjusting the duration of the second timer.

FIG. 6 illustrates an embodiment of a method that can adjust the duration of the second timer based on power consumption and available battery life. A second timer with a shorter duration can interrupt the asset upload or download sooner, which can result in reduced power consumption. One embodiment can adjust the duration of the second timer via a second timer tuning process 600 that takes into account the estimated or actual power consumption of the overall device or the specific network element in use balanced with the speed of data delivery capable with that network device and the device battery energy level. Additionally, devices may consider asset size during download or upload in relation with the above factors. In one embodiment, the second timer can act as an approximation of power consumption and can be related to the power consumption.

In one embodiment, a device with a low battery level can attempt more aggressive power reduction techniques than a device with a higher battery energy level. Accordingly, a device can perform operation 604 to analyze the device battery level, and then perform operation 606 to decrease or increase timer duration in relation to battery energy level so that when a device has a low battery, the second timer duration is shorter and downloads or uploads can be interrupted sooner. As battery energy levels increase as the device battery is charged, the second timer duration can be increased.

Additionally, differing network devices can have differing power requirements and data throughput capabilities. For example, Wi-Fi radios generally have a different power and throughput profile in relation to cellular technologies classified as "3G" or "4G". In one embodiment, devices can perform operation 608 to analyze network device data rate, and then perform operation 610 to adjust the timer duration in relation to the network data rate. In general, a low data rate, absent a low signal condition, would not impact device power consumption. However, network devices can consume greater power when communicating over a lower quality signal because of the greater amount of amplification and transmission power required. Additionally, a condition may occur where a low data rate, in conjunction with the transmission of an asset of large size, can result in an implausibly long download period, which can negatively impact device battery life.

A high data rate, in general can result in an increase in second timer duration unless the high data rate requires a high amount of power consumption. Some wireless technologies have inherently higher power requirements in relation to other wireless technologies. In general, wireless technologies classified as 4G technologies have higher power requirements than 3G or Wi-Fi technologies, and some 4G technologies have higher power requirements than other 4G technologies. One embodiment can analyze data rate in relation with operation 612, which analyzes the power requirements of the network device. A low data rate, in conjunction with a network device with a high power requirement due to, for example, a low quality wireless signal requiring a large amount of amplification, can have a negative impact on device battery life. Accordingly, embodiments can perform operation 614 to decrease timer duration in relation to network device power consumption.

In one embodiment, a device can perform operation 616 to analyze the total device power consumption. Embodiments can attempt to limit total or peak power consumption for various reasons such as limiting device thermal load, increasing overall battery life through a general reduction in power consumption, or aggressively minimizing power consumption in the event of a critically low battery. Accordingly, in one embodiment, the device can perform operation 618 which can decrease or increase the duration of the second timer in relation to overall device power consumption. As device power consumption grows, the device can reduce the second timer duration and interrupt network connections sooner to reduce power consumption or reduce thermal load.

Figure 7:
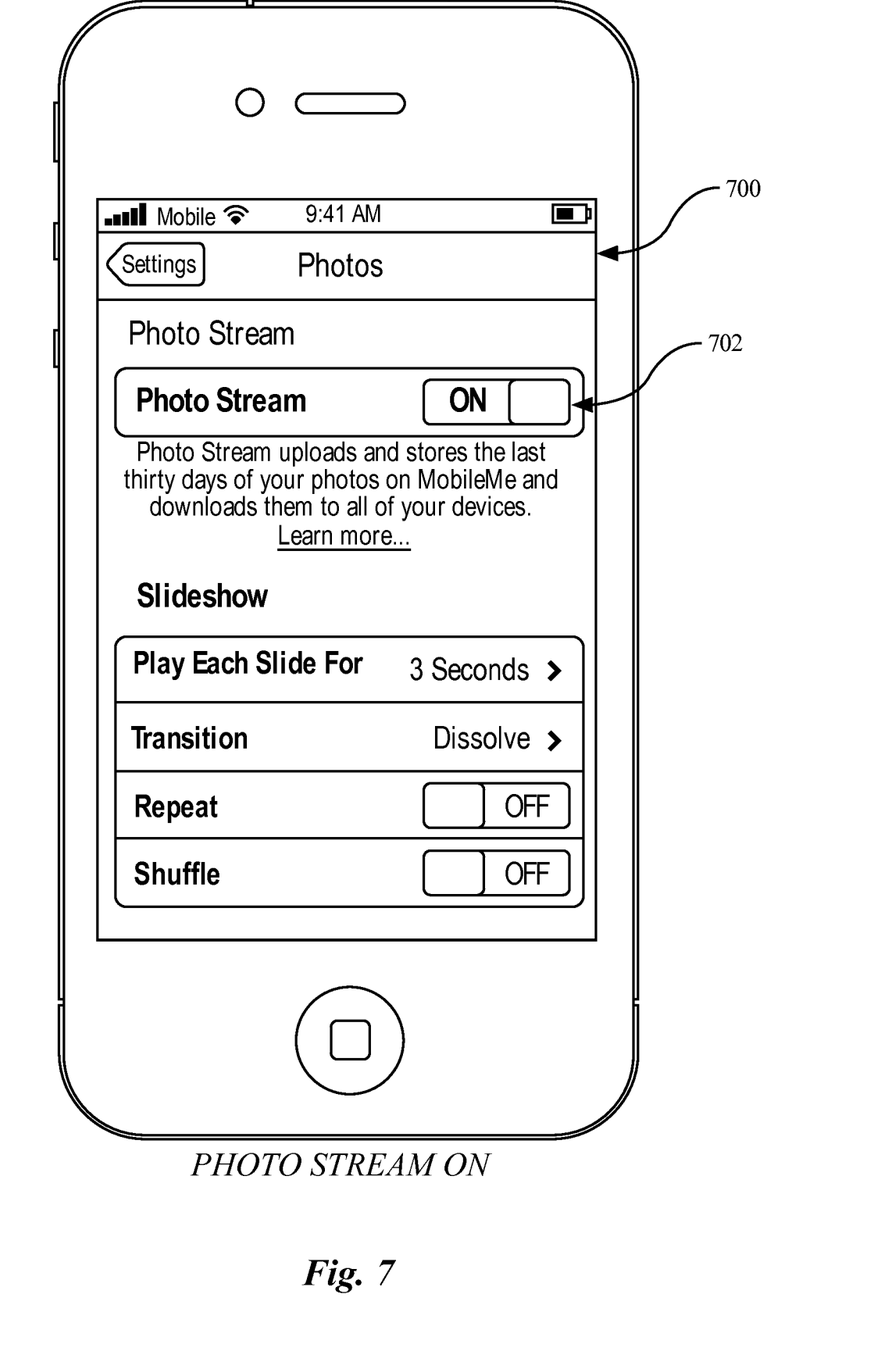
FIGS. 7-8 are exemplary screen snapshots from a device illustrating embodiments of user interfaces for use in devices supporting asset streaming.
Figure 8:
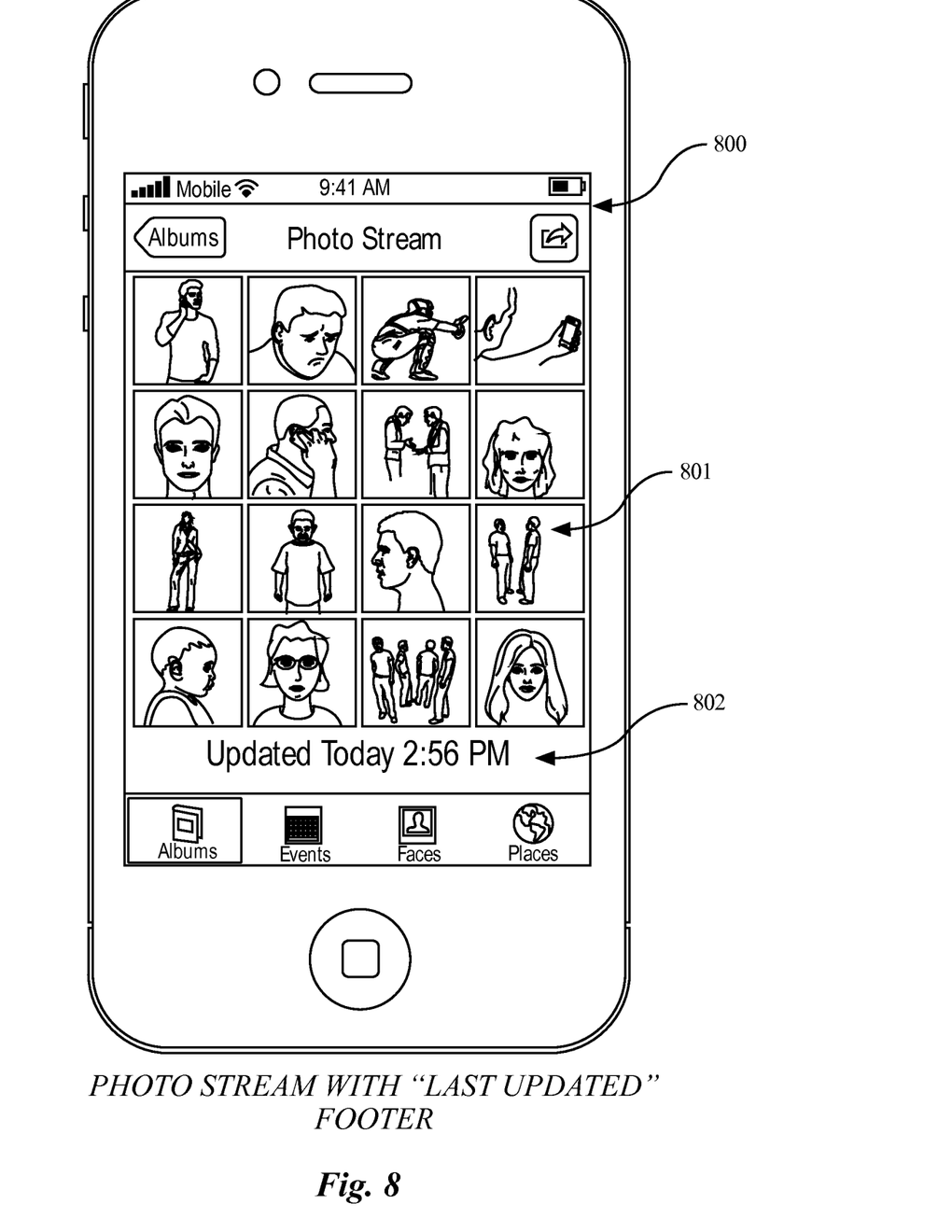

In various embodiments of the invention, media files, data files, and other electronic content may be streamed or distributed as assets, including digital photographs, video or other types of electronic content. FIG. 7 and FIG. 8 are exemplary screenshots from a device illustrating embodiments of user interfaces for use in devices supporting asset streaming in the form of digital photo streaming. As illustrated in FIG. 7, in an exemplary user interface 700 for a mobile communication device, such as the iPhone, an option for a Photo Stream feature may be selected by a user to turn on asset streaming for photo assets, and displays 702 an "ON" status accompanied by the message "Photo Stream uploads and stores the last 30 days of your photos on MobileMe and downloads them to all of your devices. Learn more . . . "

As illustrated in FIG. 8, in an exemplary user interface 800 for a mobile communication device, such as the iPhone, selecting the Albums interface 801 can display the asset images, or streamed photos, along with an informational footer 802 "Updated Today 2:56 PM"

The processes and displays presented herein are not inherently related to any particular computer or other apparatus. Any one of the methods described herein can be implemented on a variety of different data processing devices, and various general-purpose systems may be used with programs in accordance with the teachings herein. Alternatively, it may prove convenient to construct a more specialized apparatus to perform the operations described. For example, the data processing systems, which may use any one of the methods described herein, may include a desktop computer or a laptop computer or a tablet computer or a smart phone, or a cellular telephone, or a personal digital assistant (PDA), an embedded electronic device or a consumer electronic device.

Figure 9:
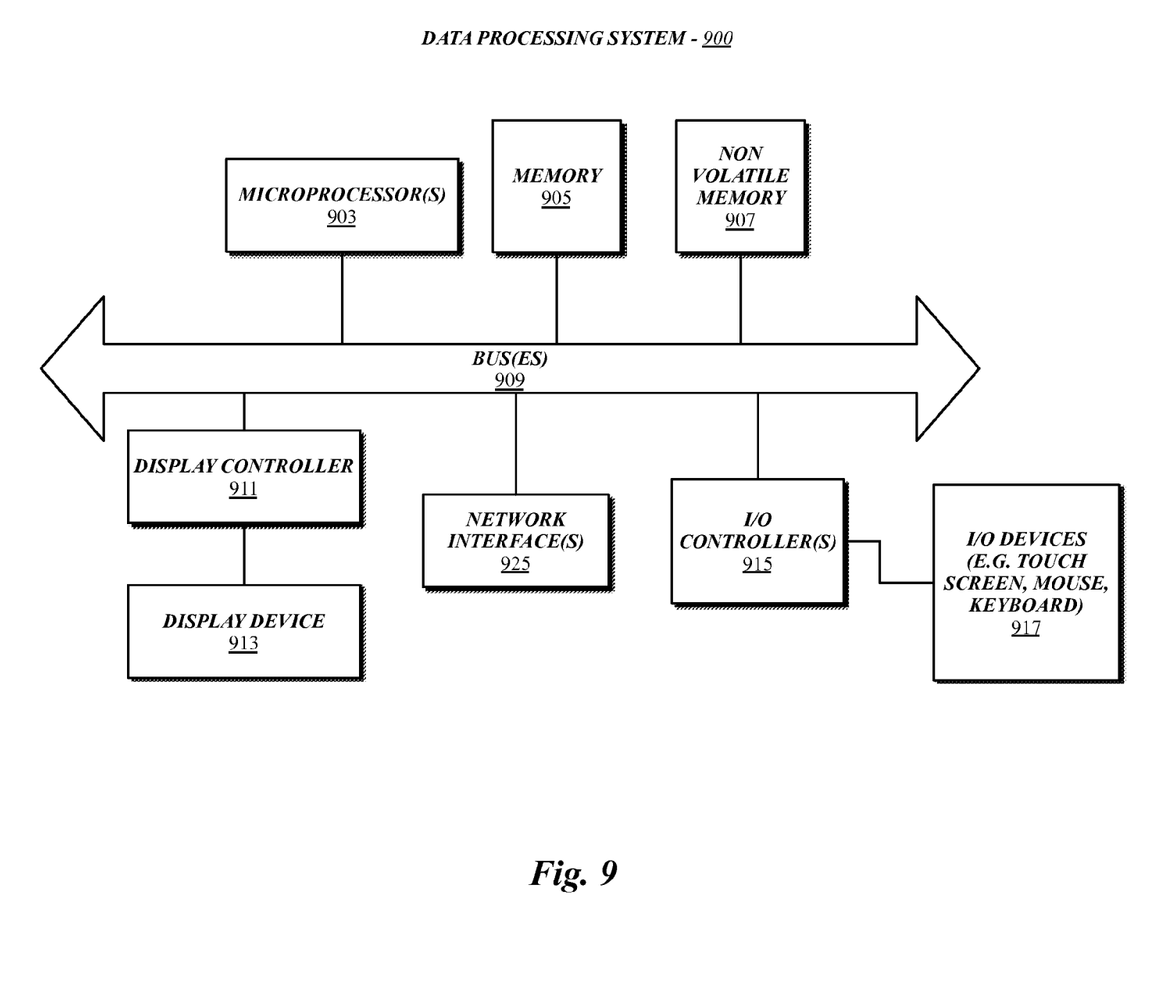
FIG. 9 illustrates an example of a typical computer system which may be used in conjunction with the embodiments described herein.

FIG. 9 shows one example of a typical data processing system which can be used with the present invention. Note that while FIG. 9 illustrates the various components of a data processing system, such as a computer system, it is not intended to represent any particular architecture or manner of interconnecting the components as such details are not germane to the present invention. It will also be appreciated that other types of data processing systems, which have fewer components than shown or more components than shown in FIG. 9, may also be used with the present invention. The data processing system of FIG. 9 may be a Macintosh computer from Apple Inc. of Cupertino, Calif. As shown in FIG. 9, the data processing system 900 includes one or more buses 909, which serve to interconnect the various components of the system. One or more processors 903 can couple to the one or more buses 909 as is known in the art. Memory 905 can be DRAM or non-volatile RAM or can be flash memory or other types of memory. This memory is coupled to the one or more buses 909 using techniques known in the art.

The data processing system 900 can also include non-volatile memory 907 which may be a hard disk drive or a flash memory or a magnetic optical drive or magnetic memory or an optical drive or other types of memory systems which maintain data even after power is removed from the system. The non-volatile memory 907 and the memory 905 can both couple to the one or more buses 909 using known interfaces and connection techniques. In one embodiment, a display controller 911 is coupled to the one or more buses 909 in order to receive display data to be displayed on a display device 913 which can display any one of the user interface features or embodiments described herein. The display device 913 can include an integrated touch input to provide a touch screen. The data processing system 900 can also include one or more input/output (I/O) controllers 915 which provide interfaces for one or more I/O devices such as one or more mice, touch screens, touch pads, joysticks, and other input devices including those known in the art. The I/O controller can also provide interfaces for one or more output devices (e.g. speakers). The input/output devices 917 can couple through one or more I/O controllers 915 as is known in the art. Additionally, one or more network interfaces 925 can also be coupled to the one or more buses to provide access to one or more networks.

While FIG. 9 shows an example of a data processing system where the non-volatile memory 907 and the memory 905 are coupled to the one or more buses directly rather than through a network interface, it will be appreciated that the data processing system can utilize a non-volatile memory which is remote from the system, such as a network storage device which is coupled to the data processing system through a network interface such as a modem or Ethernet interface or wireless interface, such as a wireless Wi-Fi transceiver or a wireless cellular telephone transceiver or a combination of such transceivers. As is known in the art, the one or more buses 909 can include one or more bridges or controllers or adapters to interconnect between various buses. In one embodiment, the I/O controller 915 includes a USB adapter for controlling USB peripherals and can control an Ethernet port or a wireless transceiver or combination of wireless transceivers.

It will be apparent from this description that aspects of the present invention may be embodied, at least in part, in software. That is, the techniques and methods described herein may be carried out in a data processing system in response to its processor executing a sequence of instructions contained in a tangible, non-transitory memory such as the memory 905 or the non-volatile memory 907 or a combination of such memories, and each of these memories is a form of a machine readable, tangible storage medium. In various embodiments, hardwired circuitry may be used in combination with software instructions to implement the present invention. Thus, the techniques are not limited to any specific combination of hardware circuitry and software or to any particular source for the instructions executed by the data processing system.

An article of manufacture may be used to store program code. An article of manufacture that stores program code may be embodied as, but is not limited to, one or more memories (e.g. one or more flash memories, random access memories (static, dynamic or other)), optical disks, CD-ROMs, DVD ROMs, EPROMs, EEPROMs, magnetic or optical cards or other type of machine-readable, non-transitory media suitable for storing electronic instructions. Program code may also be downloaded from a remote computer (e.g. a server) to a requesting computer (e.g. a client) by way of data signals embodied in a propagation medium (e.g. via a communication link (e.g. a network connection)).

Additionally, portions of what was described above may be implemented with logic circuitry such as a dedicated logic circuit or with a microcontroller or other form of processing core that executes program code instructions. Thus, processes taught by the discussion above can be performed with program code such as machine-executable instructions that cause a machine that executes these instructions to perform certain functions. In this context, a "machine" may be a machine that converts intermediate form (or "abstract") instructions into processor specific instructions (e.g. an abstract execution environment such as a "virtual machine" (e.g. a Java Virtual Machine), an interpreter, a Common Language Runtime, a high-level language virtual machine, etc.), and/or, electronic circuitry disposed on a semiconductor chip (e.g. "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The term "memory" as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into memory during execution of software by a processor. One of skill in the art will immediately recognize that the term "machine-readable storage medium" includes any type of volatile or non-volatile storage device that is accessible by a processor.

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A non-transitory computer-readable storage medium comprising executable instructions to cause a processor to perform operations, the instructions comprising:
   receiving a push notification indicating the availability of an asset on a network-based storage service;
   starting, in response to the push notification, a first timer and a second timer, wherein the first timer has a shorter period relative to the second timer;
   beginning, in response to the push notification, a download of the asset from the network-based storage service, wherein no user notification of the availability of the asset is given until the first timer expires or the download of the asset is completed;
   interrupting, responsive to the expiration of the second timer, the download of the asset from the network-based storage service, wherein interrupting the download reduces device battery consumption; and
   resuming, in response to an event, the download of the asset from the network-based storage service, wherein the download of the asset is resumed after a previous interruption of the download.

2. The computer-readable storage medium of claim 1, further comprising notifying a user, responsive to the expiration of the first timer, of the availability of the asset from the network-based storage service.

3. The computer-readable storage medium of claim 1, further comprising notifying a user, responsive to the completion of the download, of the availability of the asset from the network-based storage service, wherein the completion of the download occurs before the expiration of the first timer.

4. The computer-readable storage medium of claim 3, wherein resuming the download of the asset from the network-based storage service further comprises resuming the download at substantially the same download percentage as before the interruption of the download.

5. The computer-readable storage medium of claim 1, wherein metadata describing the asset is downloaded and available to the user before the remainder of the asset is downloaded.

6. The computer-readable storage medium of claim 1, wherein downloads from the network-based storage service are batched if a plurality of downloads are available, and wherein the period of the first timer is adjustable by a parameter set by the network-based storage service.

7. The computer-readable storage medium of claim 1, wherein the period of the second timer is adjustable by a value derived from the rate of power consumption of the mobile device.

8. The computer-readable storage medium of claim 1, wherein the period of the second timer is adjustable by a value derived from the power usage of a network interface of the mobile device.

9. The computer-readable storage medium of claim 1, wherein the period of the second timer is adjustable by a value derived from the available charge in the battery of the mobile device.

10. The computer-readable storage medium of claim 1, wherein the period of the first timer and the second timer is adjustable by a value derived from the time of day and geographic location.

11. A method at a mobile device, the method comprising:
   receiving a push notification indicating the availability of an asset on a network-based storage service;
   starting, in response to the push notification, a first timer and a second timer, wherein the first timer has a shorter period relative to the second timer;
   beginning, in response to the push notification, a download of the asset from the network-based storage service, wherein no user notification of the availability of the asset is given until the first timer expires or the download of the asset is completed;
   interrupting, responsive to the expiration of the second timer, the download of the asset from the network-based storage service, wherein interrupting the download reduces device battery consumption; and
   resuming, in response to an event, the download of the asset from the network- based storage service, wherein the download of the asset is resumed after a previous interruption of the download.

12. The method of claim 11 further comprising notifying a user, responsive to the expiration of the first timer, of the availability of the asset from the network-based storage service.

13. The method of claim 11 further comprising notifying a user, responsive to the completion of the download, of the availability of the asset from the network-based storage service, wherein the completion of the download occurs before the expiration of the first timer.

14. The method of claim 11 wherein resuming the download of the asset from the network-based storage service further comprises resuming the download at substantially the same download percentage as before the interruption of the download.

15. The method of claim 11 wherein metadata describing the asset is downloaded and available to the user before the remainder of the asset is downloaded.

16. The method of claim 11 wherein downloads from the network-based storage service are batched if a plurality of downloads are available.

17. A non-transitory computer-readable storage medium comprising executable instructions to cause a processor to perform operations, the instructions comprising:
   receiving a notification indicating access to upload an asset to a network-based storage service;
   starting, in response to the access notification, a first timer and a second timer, wherein the first timer has a shorter period relative to the second timer;
   beginning, in response to the access notification, an upload of the asset to the network-based storage service;
   interrupting, responsive to the expiration of the second timer, the upload of the asset to the network-based storage service, wherein interrupting the upload reduces device battery consumption; and
   resuming, in response to an event, the upload of the asset to the network-based storage service, wherein the upload of the asset is resumed after a previous interruption of the upload.

18. The computer readable storage medium of claim 17, wherein uploads to the network-based storage service are batched if a plurality of uploads are available.

19. The computer-readable storage medium of claim 18, wherein metadata describing the asset is uploaded to the network-based storage service before the remainder of the asset is uploaded.

20. The computer-readable storage medium of claim 19, wherein the period of the second timer is adjustable by a value derived from the rate of power consumption of the mobile device.

21. The computer-readable storage medium of claim 17, wherein the period of the second timer is adjustable by a value derived from the power usage of a network interface of the mobile device.

22. The computer-readable storage medium of claim 17, wherein the period of the second timer is adjustable by a value derived from the available charge in the battery of the mobile device.

23. The computer-readable storage medium of claim 17, wherein the period of the first timer and the second timer is adjustable by a value derived from the time of day and geographic location.

24. A method at a mobile device, the method comprising:
receiving a notification indicating access to upload an asset to a network-based storage service;
starting, in response to the access notification, a first timer and a second timer, wherein the first timer has a shorter period relative to the second timer;
beginning, in response to the access notification, an upload of the asset to the network-based storage service;
interrupting, responsive to the expiration of the second timer, the upload of the asset to the network-based storage service, wherein interrupting the upload reduces device battery consumption; and
resuming, in response to an event, the upload of the asset to the network-based storage service, wherein the upload of the asset is resumed after a previous interruption of the upload.

25. The method of claim 24, wherein metadata describing the asset is uploaded to the network-based storage service before the remainder of the asset is uploaded.

26. The method of claim 25 wherein uploads to the network-based storage service are batched if a plurality of uploads are available.

27. A data processing system comprising:
a non-transitory computer-readable storage medium, to store executable instructions; and
one or more processors, to execute instructions stored on the computer-readable storage medium, the instructions to cause the one or more processors to perform operations to,
start, in response to the receipt of a notification indicating access to a network-based storage service, a first timer and a second timer, the first timer having a shorter duration relative to the second timer,
begin, in response to the access notification, a transfer of an asset between the network-based storage service and the data processing system,
suspend, responsive to the expiration of the second timer, the transfer of the asset between the network-based storage service and the data processing system, wherein the data processing system power consumption is reduced while the transfer is suspended, and
resume, in response to an event, the transfer of the asset between the network-based storage service and the data-processing system, the transfer resumed after a previous suspension of the upload.

* * * * *